(12) United States Patent
Clark

(10) Patent No.: US 9,381,929 B1
(45) Date of Patent: Jul. 5, 2016

(54) PORTABLE SUPPORT FOR HOPPER AND MIXER

(71) Applicant: Jack Clark, Norco, CA (US)

(72) Inventor: Jack Clark, Norco, CA (US)

(*) Notice: Subject to any disclaimer, the term of this patent is extended or adjusted under 35 U.S.C. 154(b) by 0 days.

(21) Appl. No.: 14/600,175

(22) Filed: Jan. 20, 2015

(51) Int. Cl.
| | | |
|---|---|---|
| B62B 1/26 | (2006.01) | |
| B62B 1/10 | (2006.01) | |
| B05B 9/00 | (2006.01) | |
| B01F 17/00 | (2006.01) | |
| B28C 5/08 | (2006.01) | |
| B28C 5/12 | (2006.01) | |
| B05B 9/03 | (2006.01) | |
| B01F 13/00 | (2006.01) | |
| B01F 15/00 | (2006.01) | |

(52) U.S. Cl.
CPC ............... *B62B 1/26* (2013.01); *B01F 13/002* (2013.01); *B01F 13/004* (2013.01); *B01F 15/00006* (2013.01); *B01F 17/00* (2013.01); *B05B 9/007* (2013.01); *B05B 9/03* (2013.01); *B28C 5/0856* (2013.01); *B28C 5/0893* (2013.01); *B28C 5/1207* (2013.01); *B28C 5/1215* (2013.01); *B62B 1/10* (2013.01)

(58) Field of Classification Search
None
See application file for complete search history.

(56) References Cited

U.S. PATENT DOCUMENTS

| | | | | |
|---|---|---|---|---|
| 2,360,799 A * | 10/1944 | Slingsby | ................... | B62B 3/04 126/298 |
| 3,166,303 A | 1/1965 | Chapman | | |
| 3,638,923 A | 2/1972 | Pommier | | |
| 5,106,112 A * | 4/1992 | Sargent | ................ | A63C 11/026 224/917 |
| 5,318,314 A * | 6/1994 | Cyphers | ................... | B62B 1/02 141/231 |
| 5,474,312 A * | 12/1995 | Starita | ....................... | B62B 3/10 280/47.19 |
| 5,785,329 A * | 7/1998 | Stanley | ................... | B62B 3/104 141/88 |
| 5,791,469 A * | 8/1998 | Be | ........................ | A63B 47/007 190/18 A |
| 5,833,250 A * | 11/1998 | Schier | ....................... | B62B 1/22 280/47.19 |
| 6,113,129 A * | 9/2000 | Marques | ................... | B62B 1/12 248/129 |
| 6,702,608 B2 * | 3/2004 | Brennan, Jr. | ............. | B25H 3/00 280/47.19 |
| 7,070,316 B1 | 7/2006 | Roth | | |
| D527,391 S | 8/2006 | Coli | | |
| 7,417,437 B1 * | 8/2008 | Torres | ....................... | B62B 1/10 280/19 |
| 7,500,681 B2 * | 3/2009 | Steadman | ................. | B62B 1/14 280/47.131 |
| 8,061,889 B2 | 11/2011 | Mattson | | |
| D668,688 S | 10/2012 | Kennard | | |
| 2003/0001348 A1* | 1/2003 | Weida | ....................... | B62B 1/26 280/47.19 |
| 2005/0259511 A1 | 11/2005 | Orton | | |
| 2006/0145437 A1* | 7/2006 | Odgers | ................... | B62B 1/042 280/47.19 |
| 2007/0296165 A1* | 12/2007 | Stout | ......................... | B62B 1/14 280/47.19 |
| 2009/0096181 A1* | 4/2009 | Cole, Jr. | .................... | B62B 1/14 280/47.35 |
| 2010/0181737 A1* | 7/2010 | Reinicke | ................. | B62B 1/262 280/47.19 |
| 2011/0094052 A1* | 4/2011 | Witter | ................ | B01D 46/2411 15/347 |

* cited by examiner

*Primary Examiner* — S. Joseph Morano
*Assistant Examiner* — Hilary L Johns

(57) ABSTRACT

The portable support for hopper and mixer is an apparatus intended for use with a pneumatic hopper sprayer. The portable support for hopper and mixer is designed to securely hold the pneumatic hopper sprayer while in use and to easily transport the pneumatic hopper sprayer 129 and associated accessories to and from a job site. The portable support for hopper and mixer comprises a hand truck, a hopper holder, a hopper support, a tray holder, and a GFCI outlet.

4 Claims, 5 Drawing Sheets

PORTABLE SUPPORT FOR HOPPER AND MIXER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories for paint/texture and paint/texture mixing, more specifically, an accessory adapted to mix paint/texture and apply paint/texture through a spray hopper.

SUMMARY OF INVENTION

The portable support for hopper and mixer is an apparatus intended for use with a pneumatic hopper sprayer. The portable support for hopper and mixer is designed to securely hold the pneumatic hopper sprayer while in use and to easily transport the pneumatic hopper sprayer and associated accessories to and from a job site. The portable support for hopper and mixer comprises a hand truck, a hopper holder, a hopper support, a tray holder, and an electrical GFCI outlet.

These together with additional objects, features and advantages of the portable support for hopper and mixer will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable support for hopper and mixer in detail, it is to be understood that the portable support for hopper and mixer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable support for hopper and mixer.

It is therefore important that the claims be regarded as including such equivalent construction insofar as they do not depart from the spirit and scope of the portable support for hopper and mixer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
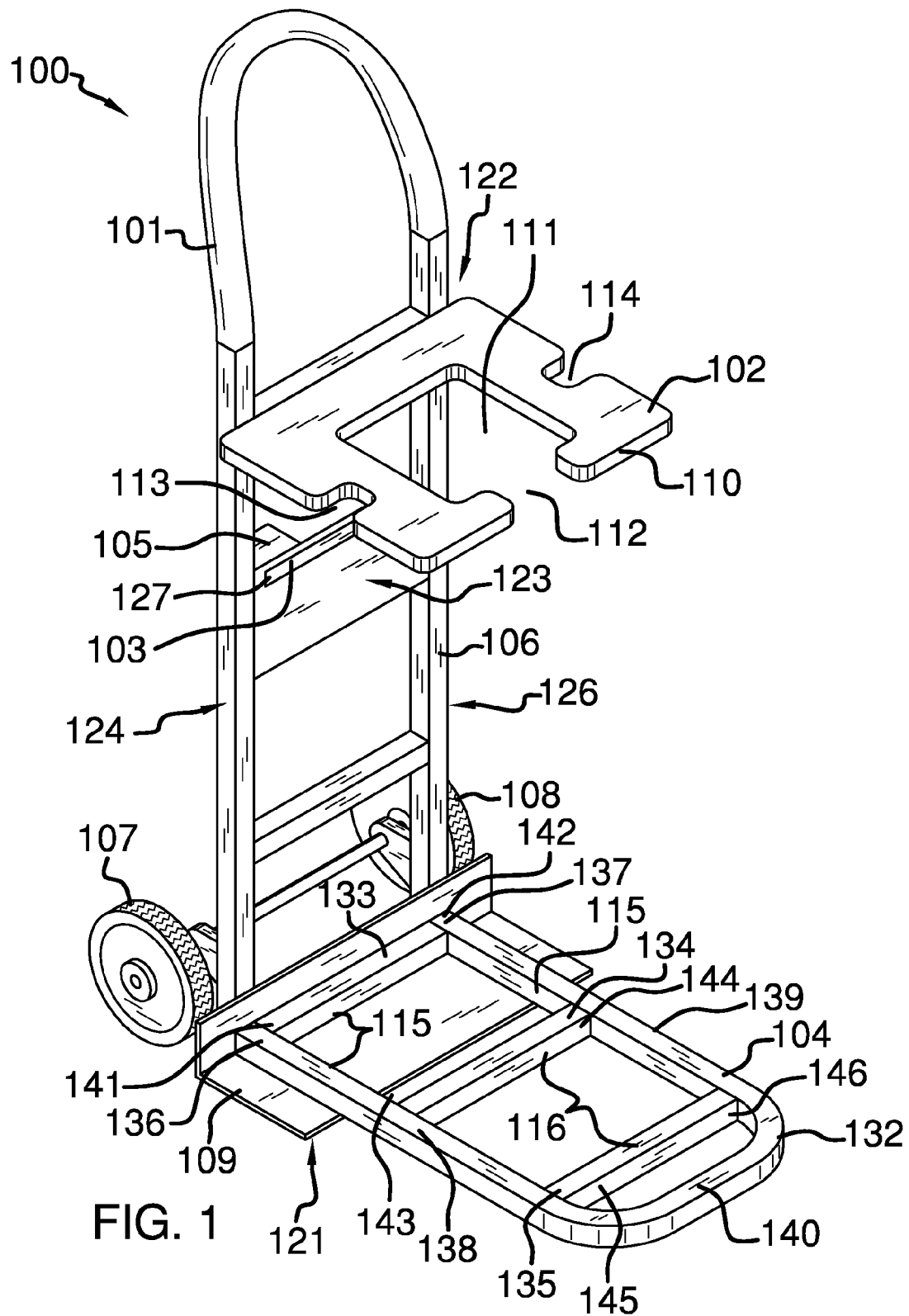
FIG. 1 is a perspective view of an embodiment of the disclosure.
Figures 2, 3:
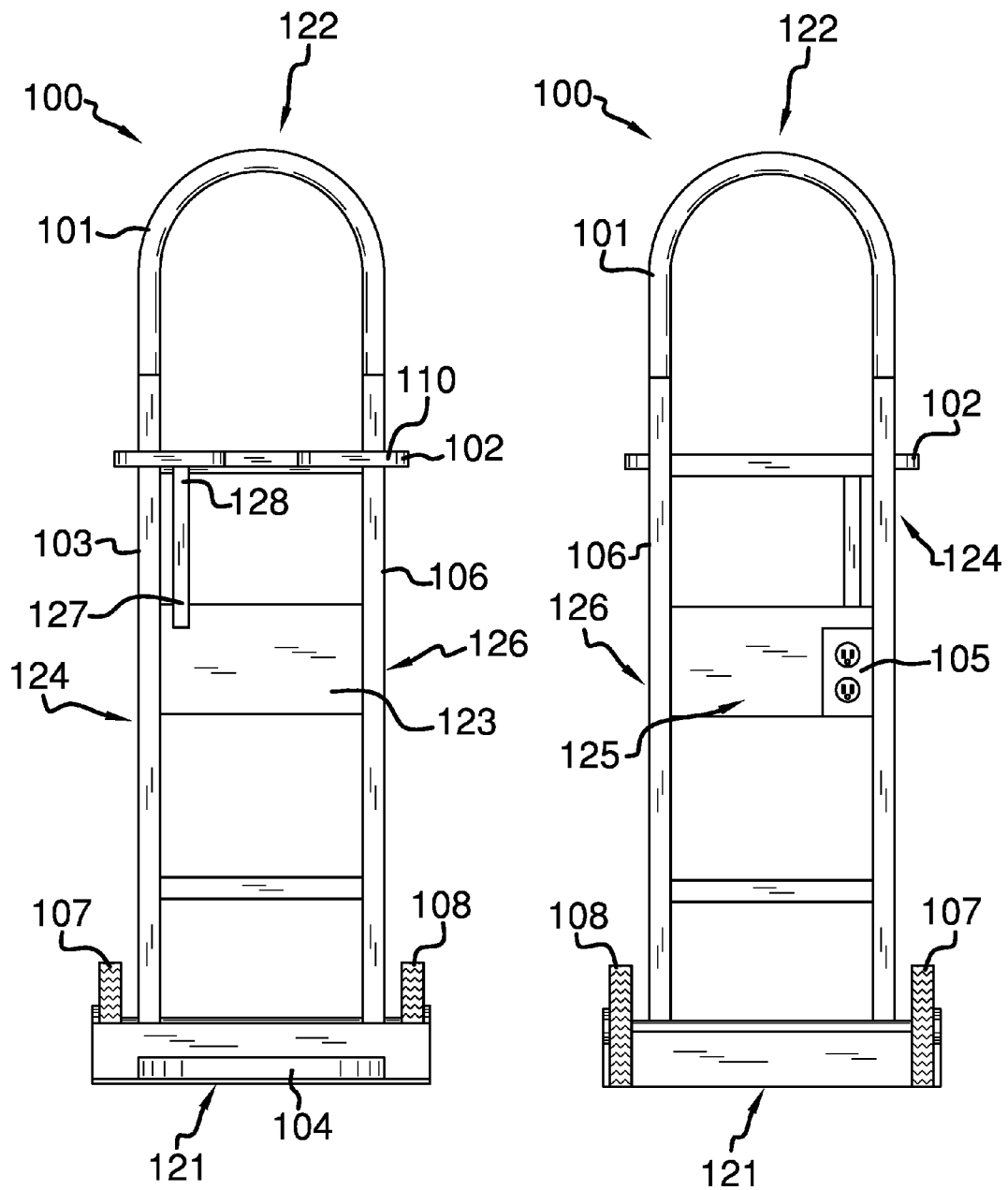
FIG. 2 is a front view of an embodiment of the disclosure.
FIG. 3 is a rear view of an embodiment of the disclosure.
Figure 4:
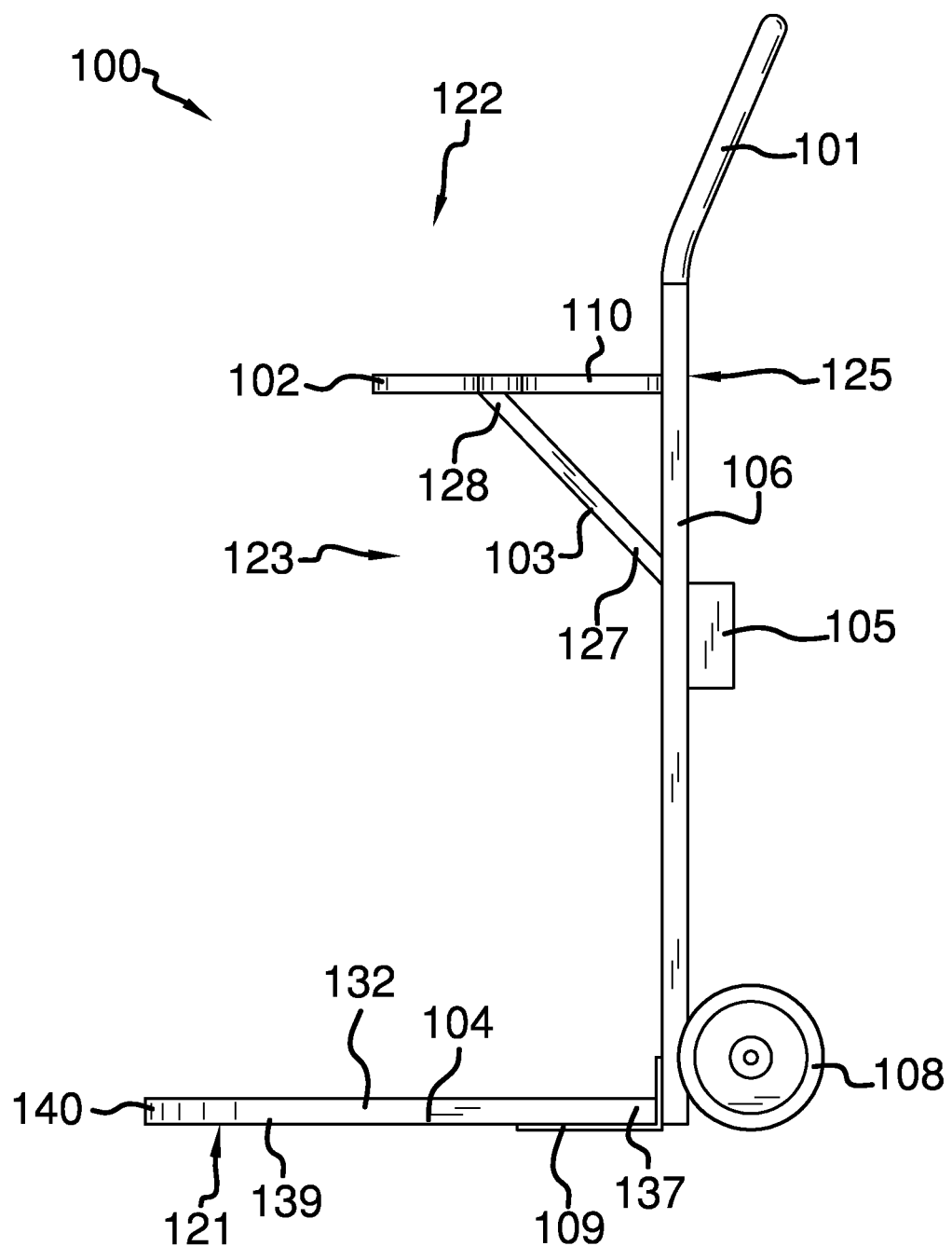
FIG. 4 is a side view of an embodiment of the disclosure.
Figure 5:
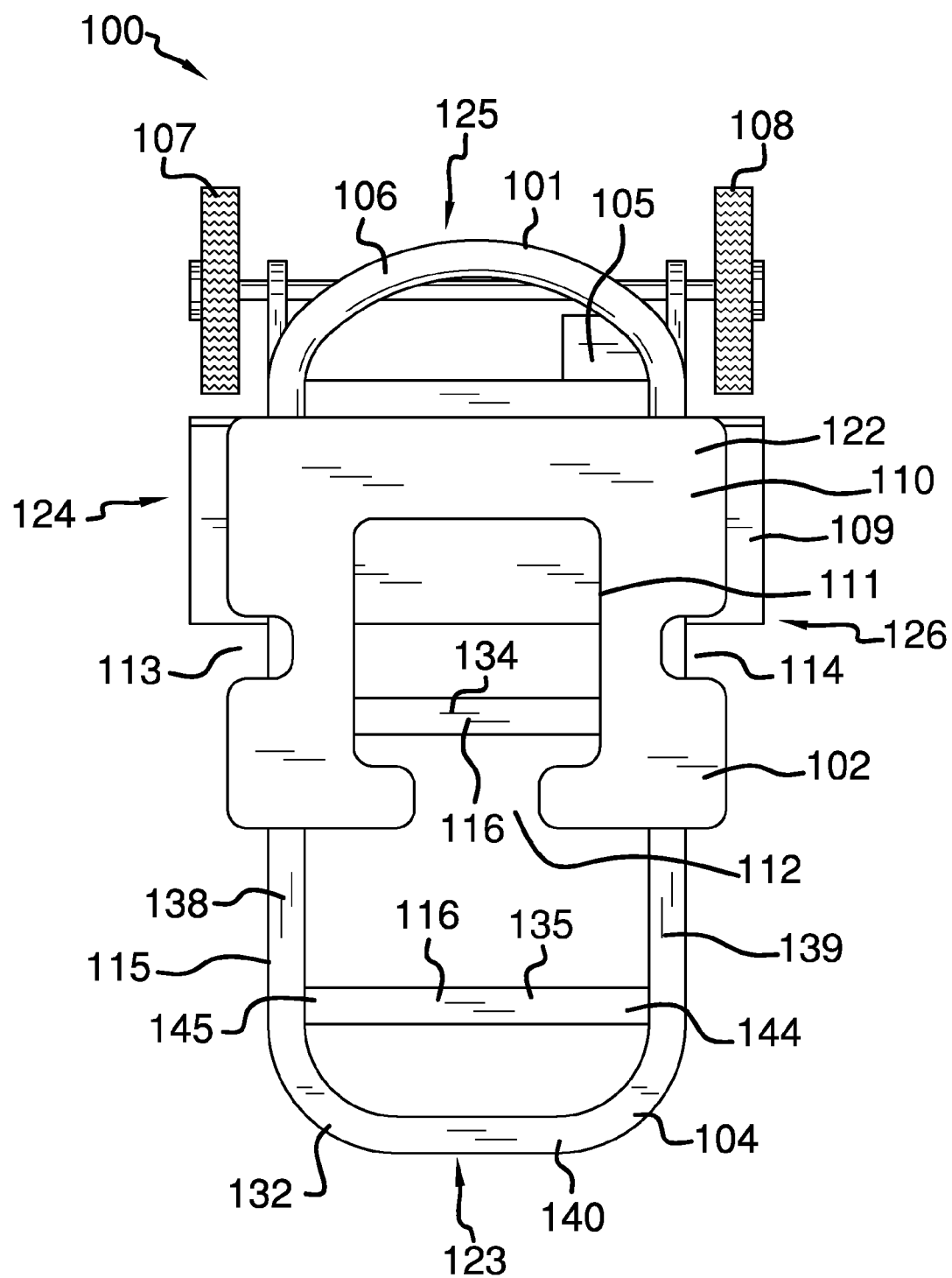
FIG. 5 is a top view of an embodiment of the disclosure.
Figure 6:
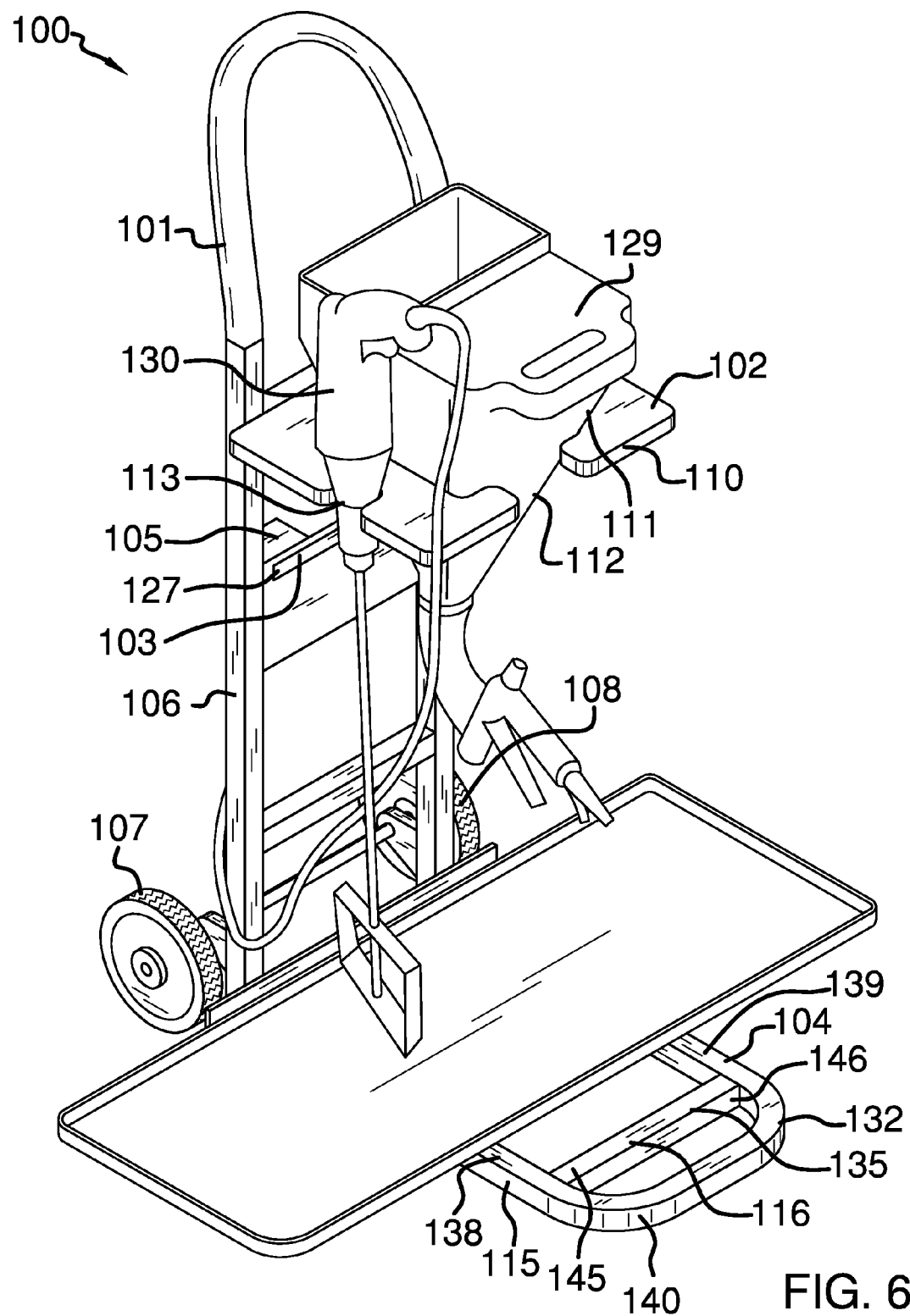
FIG. 6 is an in-use view of an embodiment of the disclosure.

Detailed reference will now be made to a first potential embodiment of the disclosure, which is illustrated in FIGS. 1 through 6. The portable support for hopper and mixer 100 (hereinafter invention) comprises a hand truck 101, a hopper holder 102, a hopper support 103, a tray holder 104, and a GFCI electrical outlet 105.

The hand truck 101 is a commercially available steel hand truck. A suitable steel hand truck will at a minimum comprise a frame 106, a first wheel 107, a second wheel 108, and a nose plate 109. A commercially available hand truck with a lock installed on the first wheel 107 and a lock installed second wheel 108 is preferable but not necessary.

The hopper holder 102 comprises a metal plate 110 formed with a rectangular hole 111, an access channel 112, a first notch 113 and a second notch 114. The metal plate 110 is a flat and stiff piece of metal in the general shape of a rectangle. A rectangular hole 111 is cut in the center of the metal plate 110 to adaptively receive and hold the pneumatic hopper sprayer 129. An access channel 112 is formed in the forward 123 edge of the metal plate 110. The access channel 112 is an opening formed in the perimeter of the metal plate 110 that extends to the rectangular hole 111.

The purpose of the access channel 112 is to allow the tapered end of the pneumatic hopper sprayer 129, and potentially the spray hose, to be inserted through the access channel 112 into the rectangular hole 111 instead of having to lift the pneumatic hopper sprayer 129 above the metal plate 110 in order to insert the pneumatic hopper sprayer 129 into the rectangular hole 111. The first notch 113 and second notch 114 are also cut into the metal plate 110. The first notch 113 is a small rectangular cut out formed on the left 124 side of the metal plate 110. The second notch 114 is a small rectangular cut out formed on the right 126 side of the metal plate 110.

Suitable metal for the metal plate 110 includes, but is not limited to, steel. The hopper holder 102 may be secured to the hand truck 101 by several means including, but not limited to, welding. The rectangular hole 111, access channel 112, first notch 113 and second notch 114 can be cut out of a solid, or blank, metal block using a plasma torch.

The hopper support 103 is a metal rod or pipe that is used to as a structural support for the hopper holder 102. The metal rod has a first end 127 and a second end 128. The first end 127 is attached to the forward 123 side of the frame 106 and the second end 128 is attached to the bottom 121 side of the metal plate 110 so that the angle between the hopper support 103 and the frame 106 is between 30 and 60 degrees.

Suitable metal for the hopper support 103 includes, but is not limited to, steel. The hopper holder 102 may secured to the hand truck 101 by several means including, but not limited to, welding.

The tray holder 104 is essentially a rectangular structure comprising a plurality of perimeter struts 115 and one or more cross braces 116. The purpose of the tray holder 104 is to hold a drip pan 131 to catch paint/texture dripping from the mixing drill 130 or the pneumatic hopper sprayer 129. As shown in a first potential embodiment, best illustrated in FIG. 1, the plurality of perimeter struts 115 comprise a U bar 132 and a closing strut 133. The one or more cross braces 116 comprise a first cross brace 134 and a second cross brace 135. The U bar 132 is a U shaped metal bar that forms most of the perimeter of the rectangular structure of the tray holder 104. The U bar 132 comprises a first leg 138, a second leg 139, a curved section 140, and has two ends called a third end 136 and a fourth end 137. The closing strut 133 has a fifth end 141 and a sixth end 142. The tray holder 104 is braced for torsional stability using the first cross brace 134 and the second cross brace 135. The first cross brace 134 has a seventh end 143 and an eighth end 144. The second cross brace 135 has a ninth end 145 and a tenth end 146.

To assemble the tray holder 104, the fifth end 141 of the closing strut 133 is attached to the third end 136 of the U bar 132 and the sixth end 142 of the closing strut 133 is attached to the fourth end 137 of the U bar 132. The seventh end 143 of the first cross brace 134 is attached to the first leg 138 of the U bar 132 and the eighth end 144 of the first cross brace 134 is attached to the second leg 139 of the U bar 132. The ninth end 145 of the second cross brace 135 is attached to the first leg 138 of the U bar 132 and the tenth end 146 of the second cross brace 135 is attached to the second leg 139 of the U bar 132.

Once assembled, the tray holder 104 is attached to the hand truck 101. The plurality of perimeter struts 115 and one or more cross braces 116 may be made of metal or plastic.

If the plurality of perimeter struts 115 and one or more cross braces 116 are made of metal, suitable metals include, but are not limited to, steel. If the plurality of perimeter struts 115 and one or more cross braces 116 are made of metal, the metal components may be attached to each other by welding. A metal tray holder 104 can be attached to the hand truck 101 frame 106 and nose plate 109 in several ways including, but not limited to, welding.

If the plurality of perimeter struts 115 and one or more cross braces 116 are made of plastic, the tray holder 104 may be formed as a single piece of molded plastic. Suitable plastics include, but are not limited to, polyvinylchloride, polyethylene and polycarbonate. A plastic tray holder 104 can be attached to the hand truck 101 frame 106 and nose plate 109 in several ways including, but not limited to, the use of mounting hardware.

The GFCI electrical outlet 105 is an electrical outlet protected against ground faults. The GFCI electrical outlet 105 is attached to the hand truck 101. A standard three prong power cord is connected to the GFCI electrical outlet 105 to allow the GFCI electrical outlet 105 to draw external power. The purpose of the GFCI electrical outlet 105 is to provide appropriate electrical power sockets for use by the mixing drill 130, pneumatic hopper sprayer 129 and air compressor.

The GFCI electrical outlet 105 and three prong power cords are commercially available. The GFCI electrical outlet 105 is attached to the hand truck 101 using commercially available hardware.

To use the invention 100, the invention 100 is brought to the location to be painted/textured. The pneumatic hopper sprayer 129 is then installed into the hopper holder 102 by inserting the tapered end through the rectangular hole 111 cut in the metal plate 110 until it is held securely. A mixing drill 130 is then attached either the first notch 113 or the second notch 114 that was formed in the metal plate 110. The front end of the mixing drill 130 can be inserted into the first notch 113 or the second notch 114 until the edge of the mixing drill 130 presses against the sides of either the first notch 113 or the second notch 114. Alternatively, the mixing drill 130 can be attached using standard hardware fittings. A drip pan 131 is then placed on the tray holder 104. The GFCI electrical outlet 105 is plugged in. The mixing drill 130, and if necessary the pneumatic hopper sprayer 129, is then plugged into the GFCI electrical outlet 105 and compressed air is applied to the pneumatic hopper sprayer 129. The mixing drill 130 and pneumatic hopper sprayer 129 can then be used normally.

The following directional references are used in this disclosure. The first wheel 107, second wheel 108, and nose plate 109 of the hand truck 101 are mounted at bottom 121 of the invention 100. The hopper holder 102 is mounted towards the top 122 of the invention 100. The nose plate 109 and the hopper holder 102 project out from the forward 123 side of the frame 106. When viewed from the top 122, the remaining sides going clockwise from the forward 123 side are called the left 124 side, back 125 side, and right 126 side.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable support for a hopper and mixer comprising:
   a hand truck,
   a hopper holder is supported on said hand truck via a hopper support;
   a tray holder is affixed to said hand truck;
   wherein the hopper holder is adapted to support a pneumatic hopper sprayer;
   wherein the hand truck includes a GFCI outlet thereon;
   wherein the hand truck is further defined with a frame, a first wheel, a second wheel, and a nose plate;
   wherein the hopper holder is further defined as a plate formed with a rectangular hole, an access channel, a first notch and a second notch;

wherein the rectangular hole is located in a center of the hopper holder; wherein the rectangular hole is adapted to receive and hold the pneumatic hopper sprayer;

wherein the access channel is formed in a forward edge of the hopper holder; wherein the access channel extends to the rectangular hole on the hopper holder; wherein the access channel is adapted to allow a tapered end of the pneumatic hopper sprayer to be inserted through the access channel, and into the rectangular hole;

wherein the first notch is a rectangular cut out formed on a left side of the hopper holder; wherein the second notch is a rectangular cut out formed on a right side of the hopper holder;

wherein the hopper support is a structural support for the hopper holder; wherein the hopper support is a rod that has a first end and a second end; wherein the first end is attached to a forward side of the frame of the hand truck; wherein the second end is attached to a bottom side of the hopper holder such that an angle between the hopper support and the frame ranges from 30 and 60 degrees;

wherein the tray holder is a rectangular structure comprising a plurality of perimeter struts and one or more cross braces; wherein the tray holder is used to hold a drip pan; wherein the drip pan is adapted to catch paint/texture dripping from a mixing drill or the pneumatic hopper sprayer;

wherein the plurality of perimeter struts comprise a U bar and a closing strut; wherein the one or more cross braces comprise a first cross brace and a second cross brace; wherein the U bar forms a majority of the perimeter of the tray holder; wherein the U bar is further defined with a first leg, a second leg, a curved section, a third end, and a fourth end;

wherein the closing strut has a fifth end and a sixth end; wherein the tray holder is braced for torsional stability using the first cross brace and the second cross brace; wherein the first cross brace has a seventh end and an eighth end; wherein the second cross brace has a ninth end and a tenth end; wherein the fifth end of the closing strut is attached to the third end of the U bar; wherein the sixth end of the closing strut is attached to the fourth end of the U bar; wherein the seventh end of the first cross brace is attached to the first leg of the U bar; wherein the eighth end of the first cross brace is attached to the second leg of the U bar; wherein the ninth end of the second cross brace is attached to the first leg of the U bar; wherein the tenth end of the second cross brace is attached to the second leg of the U bar.

2. The portable support for a hopper and mixer according to claim 1 wherein the GFCI electrical outlet is attached to the hand truck; wherein the GFCI electrical outlet is wired to draw external power; wherein the GFCI electrical outlet provides electrical power sockets for use by the mixing drill, pneumatic hopper sprayer or other electrical devices.

3. A portable support for a hopper and mixer comprising:
a hand truck,
a hopper holder is supported on said hand truck via a hopper support;
a tray holder is affixed to said hand truck;
wherein the hopper holder is adapted to support a pneumatic hopper sprayer;
wherein the hand truck includes a GFCI outlet thereon;
wherein the hand truck is further defined with a frame, a first wheel, a second wheel, and a nose plate;
wherein the hopper holder is further defined as a plate formed with a rectangular hole, an access channel, a first notch and a second notch;

wherein the rectangular hole is located in a center of the hopper holder; wherein the rectangular hole is adapted to receive and hold the pneumatic hopper sprayer;

wherein the access channel is formed in a forward edge of the hopper holder;

wherein the access channel extends to the rectangular hole on the hopper holder;

wherein the access channel is adapted to allow a tapered end of the pneumatic hopper sprayer to be inserted through the access channel, and into the rectangular hole;

wherein the first notch is a rectangular cut out formed on a left side of the hopper holder;

wherein the second notch is a rectangular cut out formed on a right side of the hopper holder;

wherein the hopper support is a structural support for the hopper holder;

wherein the hopper support is a rod that has a first end and a second end;

wherein the first end is attached to a forward side of the frame of the hand truck;

wherein the second end is attached to a bottom side of the hopper holder such that an angle between the hopper support and the frame ranges from 30 and 60 degrees;

wherein the tray holder is a rectangular structure comprising a plurality of perimeter struts and one or more cross braces;

wherein the tray holder is used to hold a drip pan;

wherein the drip pan is adapted to catch paint/texture dripping from a mixing drill or the pneumatic hopper sprayer;

wherein the plurality of perimeter struts comprise a U bar and a closing strut;

wherein the one or more cross braces comprise a first cross brace and a second cross brace;

wherein the U bar forms a majority of the perimeter of the tray holder;

wherein the U bar is further defined with a first leg, a second leg, a curved section, a third end, and a fourth end;

wherein the closing strut has a fifth end and a sixth end; wherein the tray holder is braced for torsional stability using the first cross brace and the second cross brace;

wherein the first cross brace has a seventh end and an eighth end;

wherein the second cross brace has a ninth end and a tenth end;

wherein the fifth end of the closing strut is attached to the third end of the U bar;

wherein the sixth end of the closing strut is attached to the fourth end of the U bar;

wherein the seventh end of the first cross brace is attached to the first leg of the U bar;

wherein the eighth end of the first cross brace is attached to the second leg of the U bar;

wherein the ninth end of the second cross brace is attached to the first leg of the U bar;

wherein the tenth end of the second cross brace is attached to the second leg of the U bar.

4. The portable support for a hopper and mixer according to claim 3 wherein the GFCI electrical outlet is attached to the hand truck; wherein the GFCI electrical outlet is wired to draw external power; wherein the GFCI electrical outlet provides electrical power sockets for use by the mixing drill, pneumatic hopper sprayer or other electrical devices.

* * * * *